United States Patent [19]

Mikami

[11] 4,175,332

[45] Nov. 27, 1979

[54] METHOD OF MEASURING DIRECTIONAL PROPERTIES OF SURFACE OF SHAFTS

[75] Inventor: Yasuo Mikami, Fukushima, Japan

[73] Assignee: Nippon Oil Seal Industry Co., Ltd., Tokyo, Japan

[21] Appl. No.: 884,167

[22] Filed: Mar. 7, 1978

[30] Foreign Application Priority Data

Mar. 8, 1977 [JP] Japan .................................. 52-25190
Jan. 17, 1978 [JP] Japan .................................. 53-3548

[51] Int. Cl.² .............................................. G01C 5/28
[52] U.S. Cl. ..................................... 33/174 R; 73/105
[58] Field of Search ............. 33/174 Q, 174 P, 174 R, 33/91, 92; 73/105

[56] References Cited

U.S. PATENT DOCUMENTS 4,050,293  9/1977  Shimomura et al. .................. 73/105

FOREIGN PATENT DOCUMENTS 72238  6/1947  Norway ................................. 33/174 Q

*Primary Examiner*—Willis Little
*Attorney, Agent, or Firm*—Holman & Stern

[57] ABSTRACT

Disclosed is a method of measuring the directional properties of the surface of shafts by pressing a measuring contact terminal against the surface of an objective shaft which is horizontally and rotatably supported, to thereby measure the amount of movement in the axial direction of the contact terminal caused by the rotation of the object shaft.

5 Claims, 6 Drawing Figures

METHOD OF MEASURING DIRECTIONAL PROPERTIES OF SURFACE OF SHAFTS

BACKGROUND OF THE INVENTION

1. Field of the Invention

The present invention relates to a method of measuring the directional properties of the surface of shafts and, more particularly, to a method of measuring the directional properties of the surface of shafts by pressing a measuring contact terminal against the objective surface of a shaft.

2. Description of the Prior Art

In the past, the directional properties of the surface of shafts which constitute various kinds of machines and tools were measured by directly observing the objective surface while using a magnifying means or by observing a replica of the objective surface while using a magnifying means. According to these methods, however, it is difficult to quantitatively measure the directional properties of the surface of shafts.

SUMMARY OF THE INVENTION

An object of the present invention is to provide a method of measuring the directional properties of the surface of shafts. Another object of the present invention is to provide a method of quantitatively measure the directional properties of the surface of shafts by using a measuring contact terminal.

A still another object of the present invention is to provide a method of measuring the directional properties of the surface of shafts by pressing a measuring contact terminal against the objective surface so as to measure the amount of movement in the axial direction of the terminal caused by the rotation of the shaft.

To these ends, according to the present invention, there is provided a method of measuring the directional properties of shafts, which comprises pressing a measuring contact terminal against the surface to be measured of a shaft which is horizontally and movably supported, to measure the amount of movement in the axial direction of the terminal caused by the rotation of the shaft.

The above and other objects, as well as advantageous features of the invention will become clear from the following description of the preferred embodiments taken in conjunction with the accompanying drawings.

DETAILED DESCRIPTION OF PREFERRED EMBODIMENTS

An object of the present invention is to provide a method of measuring the directional properties of the circumferential surface of a rotary shaft used for various kinds of machines and tools.

For example, in the case of a rotary shaft for an oil seal, the directional properties given to the surface thereof, during the processing thereof, on which the sealing lip of the oil seal is frictionally moved are so important that they affect the capability of preventing the leakage of the liquid to be sealed. It is necessary that the microscopic projections on the surface of the rotary shaft be extended exactly in the direction of right angle with respect to the axis of the rotary shaft.

In view of the importance of the directional properties as mentioned above of the circumferential surface of a rotary shaft, the present invention provides a very simple method of measuring the directional properties of the surface of a shaft, which method permits obtaining highly accurate measurement values.

The present invention relates to a method of measuring the directional properties of the surface of a shaft by pressing a measuring contact terminal against the surface of an objective shaft, which is horizontally and rotatably supported, to thereby measure the amount of movement in the axial direction of the contact terminal caused by the rotation of the objective shaft. Wire-type materials, such as fibers linearlly contacting the objective surface, needle-type materials, such as needles contacting a point of the objective surface, and plate-type materials made of rubber, plastics, metals and leather widely contacting the objective surface are suitable for the measuring contact terminal used in the present invention.

Now, the present invention will be described in detail below with reference to the accompanying drawings.

Figure 1:
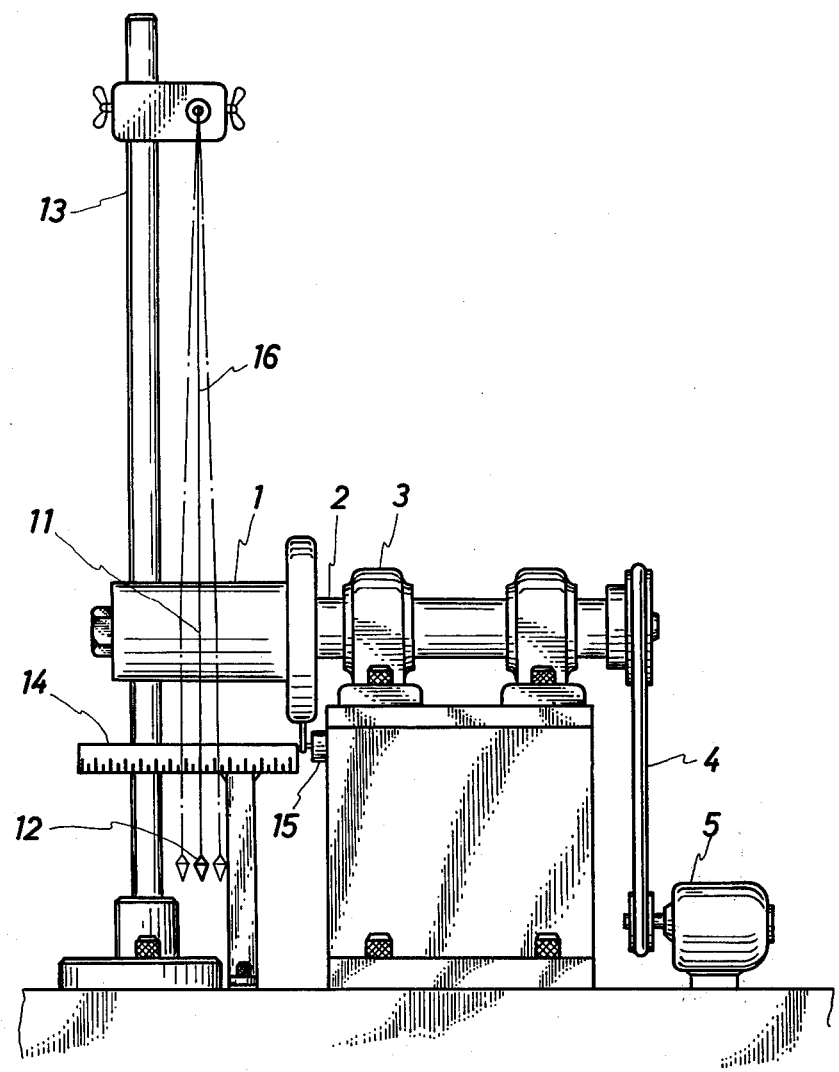
FIG. 1 is a front elevational view of an embodiment of the method of the present invention of measuring the directional properties of a rotary shaft.
Figure 2:
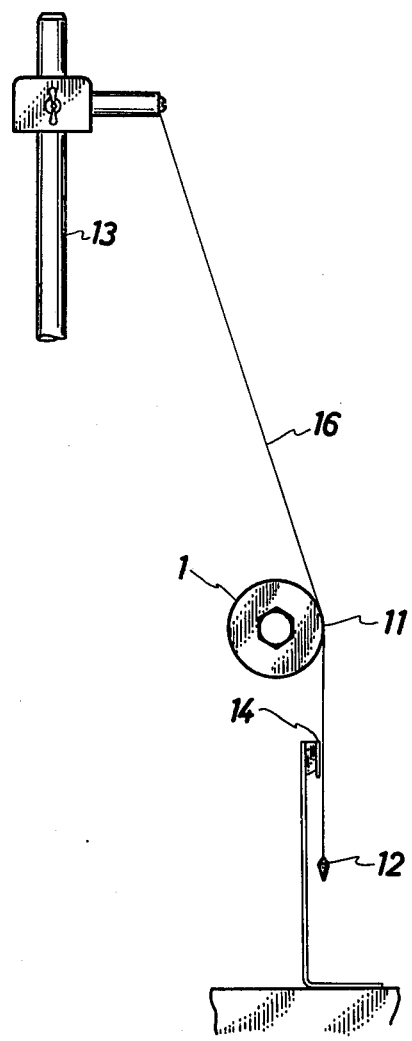
FIG. 2 is a side elevational view of the embodiment as shown in FIG. 1, which shows the relation in position between an objective shaft and a wire-type measuring material.

FIGS. 1 and 2 show an embodiment of the method of the present invention of measuring the directional properties of the surface of a rotary shaft. A shaft 1 to be measured is concentrically mounted on a main shaft 2 while keeping the axis thereof horizontal, which main shaft 2 is rotatably supported by bearings 3. The shaft 1 can be rotated in an optional direction at an optional speed by a speed-changeable, reversible motor 5 via a rotation transmitting means 4. A fibrous wire-type measuring material 16 one end of which is held in a position above and at the rear side of the shaft 1 is extended to a position lower than the shaft 1 and tensed by a weight 12 attached to the lower end thereof while contacting the surface to be measured of the shaft 1. The position in which the upper end of the wire-type material 16 is fixed can be moved horizontally and vertically by operating a support post 13. The wire-type material 16 is stopped at a measuring position by horizontally moving the support post 13. The pressure of the wire-type material 16 exerted on the surface to be measured is adjusted by moving the support post in both the horizontal and vertical directions. A scale 14 is provided under the shaft 1 and at the back of the wire-type material 16, and it is substantially parallel to the shaft 1. A revolution indicator 15 is connected to the main shaft 2 to count the number of revolution thereof. In this embodiment, the portion of the wire-type measuring material 16 that contacts the surface of the shaft 1 serves as a measuring contact terminal 11.

Referring to FIGS. 3–6, other examples of measuring contact terminals used in the present invention will be described below.

Figure 3:
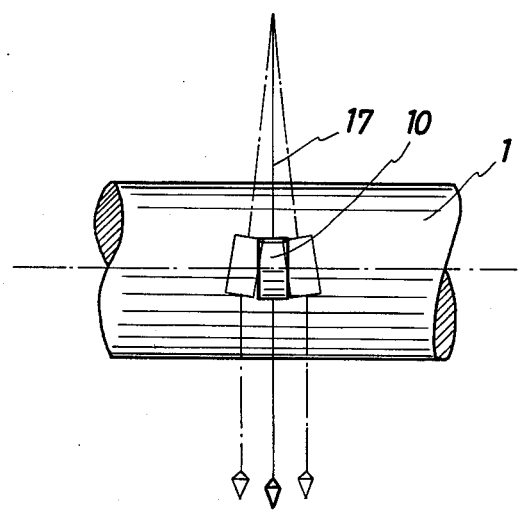
FIG. 3 is a front elevational view of another embodiment of measuring contact terminal used in the present invention.
Figure 4:
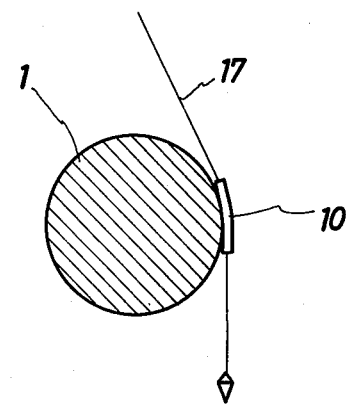
FIG. 4 is a side elevational view of the embodiment as shown in FIG. 3.

A measuring contact terminal 10 as shown in FIGS. 3 and 4 is a plate-type one made of an elastic material, such as rubber, attached to the intermediate portion of a fishing-line 17 and pressed against the surface to be measured of the shaft 1, and the fishing-line 17 is supported in the same manner as the above-mentioned wire-type measuring material 16.

Figure 5:
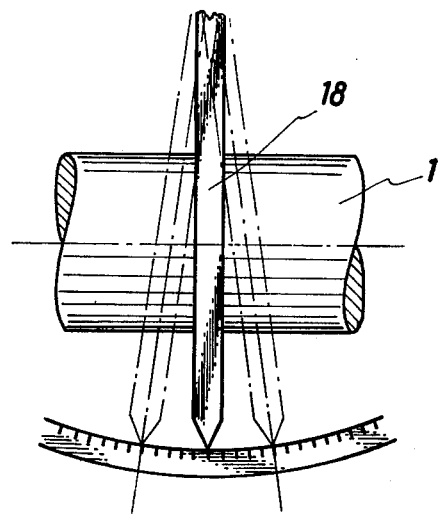
FIG. 5 is a front elevational view of still another embodiment of measuring contact terminal used in the present invention.
Figure 6:
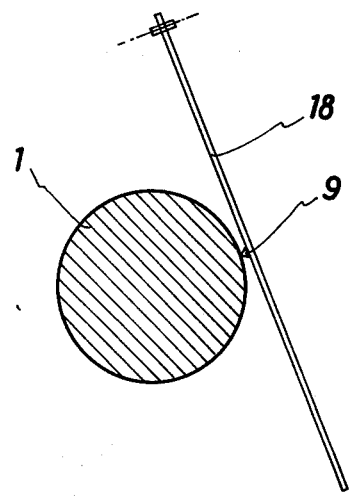
FIG. 6 is a side elevational view of the embodiment as shown in FIG. 5.

A measuring contact terminal 9 as shown in FIGS. 5 and 6 is a needle-type one provided on the inner surface of an arm 18 one end of which is ocillatably supported, and it is pressed against the surface to be measured of the shaft 1.

The method according to the present invention of measuring the directional properties of the surface of a shaft will be described below with reference to the embodiment as shown in FIGS. 1 and 2.

The position in which the wire-type measuring material 16 is supported and the position of the scale 14 are set with reference to the diameter of the shaft 1 and the position of the portion to be measured thereof. Then, the main shaft 2 is slowly rotated in the forward and reverse directions to check the shaft 1 whether the measuring contact terminal 11 provided on the wire-type material 16 and in contact with the surface of the shaft 1 is horizontally moved. When the terminal 11 in contact with the surface of the shaft 1 is not moved in any direction, it indicates that the shaft 1 has no directional properties. When the terminal 11 in contact with the surface of the shaft 1 is moved, it is necessary to check the interrelation between the direction in which the main shaft 2 was rotated and the direction in which the wire-type measuring material 16 was moved and check the number of revolution of the main shaft 2 with the revolution indicator 15 and the amount of movement of the wire-type measuring with the scale 14. The direction (of inclination) of the microscopic projections of the shaft 1 is known by checking the interrelation between the direction in which the main shaft 2 was rotated and the direction in which the wire-type measuring material 16 was moved. The amount of inclination (angle of torsion) of the microscopic projections is known by checking the interrelation between the number of revolution of the main shaft 2 and the amount of movement of the shaft 1.

The method of the present invention of measuring the directional properties of a rotary shaft has the above-mentioned constitutional elements. Owing to these constitutional elements, the measuring apparatus can be simply constructed. Moreover, the method of the present invention permits obtaining accurate measurement values by a simple operation of the apparatus and has advantages in that it can be used to measure even minute directional properties.

The present invention is not limited to the above-described embodiments; it may be modified in various ways within the scope of the appended claims.

What is claimed is:

1. A method for measuring directional properties of the surface of a shaft, said method comprising the steps of:
    rotatably supporting said shaft with a horizontal rotational axis;
    supporting a measuring contact terminal against the surface of said shaft and for horizontal movement;
    rotating said shaft in the forward direction;
    rotating said shaft in the reverse direction; and
    measuring the number of revolutions of said shaft and the amount of horizontal movement said measuring contact terminal undergoes during the shaft rotating steps.

2. The method of claim 1 wherein said supporting step includes pivotally supporting an upper end of the measuring contact terminal.

3. The method of claim 1 wherein said supporting step comprises the step of providing linear contact between said contact terminal and said surface.

4. The method of claim 1 wherein said supporting step comprises the step of providing point contact between said contact terminal and said surface.

5. The method of claim 1 wherein said supporting step comprises the step of providing face contact between said contact terminal and said surface.

* * * * *